United States Patent
Xiao et al.

(10) Patent No.: US 10,062,374 B2
(45) Date of Patent: Aug. 28, 2018

(54) METHODS AND APPARATUS FOR TRAINING A TRANSFORMATION COMPONENT

(71) Applicant: Nuance Communications, Inc., Burlington, MA (US)

(72) Inventors: Xiaoqiang Xiao, Arlington, MA (US); Chengyuan Ma, Winchester, MA (US); Venkatesh Nagesha, Wayland, MA (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 14/335,044

(22) Filed: Jul. 18, 2014

(65) Prior Publication Data

US 2016/0019884 A1    Jan. 21, 2016

(51) Int. Cl.
| | |
|---|---|
| *G10L 15/06* | (2013.01) |
| *G10L 15/065* | (2013.01) |
| *G10L 15/16* | (2006.01) |
| *G10L 15/20* | (2006.01) |

(52) U.S. Cl.
CPC .......... *G10L 15/063* (2013.01); *G10L 15/065* (2013.01); *G10L 15/16* (2013.01); *G10L 15/20* (2013.01)

(58) Field of Classification Search
None
See application file for complete search history.

(56) References Cited

U.S. PATENT DOCUMENTS

| | | | | |
|---|---|---|---|---|
| 5,737,485 A | * | 4/1998 | Flanagan | ............... G10L 15/16 |
| | | | | 704/232 |
| 2009/0164212 A1 | * | 6/2009 | Chan | ................... G10L 21/0208 |
| | | | | 704/226 |

OTHER PUBLICATIONS

Steve Renals, (Deep) Neural Networks, Mar. 18, 2013, pp. 1-6 URL: http://www.inf.ed.ac.uk/teaching/courses/asr/2012-13/asr10-dnn-4up.pdf.*

Steve Renals, (Deep) Neural Networks, Mar. 18, 2013, pp. 1-6 URL: https://www.inf.ed.ac.uk/teaching/courses/asr/2012-13/asr10-dnn-4up.pdf.*

(Continued)

*Primary Examiner* — Richa Mishra
(74) *Attorney, Agent, or Firm* — Wolf, Greenfield & Sacks, P.C.

(57) ABSTRACT

According to some aspects, a method of training a transformation component using a trained acoustic model comprising first parameters having respective first values established during training of the acoustic model using first training data is provided. The method comprises using at least one computer processor to perform coupling the transformation component to a portion of the acoustic model, the transformation component comprising second parameters, and training the transformation component by determining, for the second parameters, respective second values using second training data input to the transformation component and processed by the acoustic model, wherein the acoustic model retains the first parameters having the respective first values throughout training of the transformation component.

14 Claims, 6 Drawing Sheets

(56) References Cited

OTHER PUBLICATIONS

Tapani Raiko, Harri Valpola, Yann LeCun; Deep Learning Made Easier by Linear Transformations in Perceptrons; 2012, Proceedings of the Fifteenth International Conference on Artificial Intelligence and Statistics,; Pertinent pp. 924-932 URL: http://proceedings.mlr.press/v22/raiko12/raiko12.pdf.*

Renals, (Deep) Neural Networks. Automatic Speech Recognition—ASR Lectures 14 & 15. Mar. 2013. Available at http://www.inf.ed.ac.uk/teaching/courses/asr/2012-13/asr10-dnn-4up.pdf. 6 pages.

* cited by examiner

METHODS AND APPARATUS FOR TRAINING A TRANSFORMATION COMPONENT

BACKGROUND

Automatic speech recognition (ASR) systems are utilized in a variety of applications to automatically recognize the content of speech, and typically, to provide a textual representation of the recognized speech content. ASR systems typically utilize one or more statistical models (e.g., acoustic models, language models, etc.) that are trained using a relatively large corpus of training data. For example, speech/acoustic training data may be utilized to train one or more acoustic models. Via training, an acoustic model "learns" acoustic characteristics of the training data utilized so as to be able to accurately identify sequences of speech units in speech data received when the trained ASR system is subsequently deployed. To achieve adequate training, relatively large amounts of training data are generally needed.

Due in part to the wide-spread adoption and use of ASR technology, ASR systems are frequently utilized in a variety of environments and by a wide variety of users using different audio capture devices and channels. As a result, an ASR system may be utilized in an acoustic environment wherein received speech data is ill-matched, from an acoustic characteristic perspective, to training data on which the ASR system was trained. That is, the speech/acoustic training data used to train the corresponding acoustic model(s) may insufficiently or poorly represent acoustic characteristics of speech data received from users during deployment in a given acoustic environment. As a result, the accuracy of the ASR system in recognizing such speech data will suffer and may result in unsatisfactory performance.

Generally speaking, it is not feasible to train an acoustic model with training data that sufficiently represents or captures the acoustic characteristics of any and all arbitrary speech data that may be received by an ASR system in the variety of environments that the ASR system may be deployed. In particular, the variety of training data that would be needed to do so is not likely available in sufficient quantity, if available at all. As such, it is often not possible even to sufficiently train an acoustic model for a specific acoustic environment due to the lack of the relatively large amounts of training data representative of the specific acoustic environment that is conventionally needed to train an acoustic model.

SUMMARY

Some embodiments include a method of training a transformation component using a trained acoustic model comprising first parameters having respective first values established during training of the acoustic model using first training data, the method comprising using at least one computer processor to perform coupling the transformation component to a portion of the acoustic model, the transformation component comprising second parameters, and training the transformation component by determining, for the second parameters, respective second values using second training data input to the transformation component and processed by the acoustic model, wherein the acoustic model retains the first parameters having the respective first values throughout training of the transformation component.

Some embodiments include at least one computer readable storage medium for storing instructions that, when executed by at least one hardware processor, perform a method of training a transformation component using a trained acoustic model comprising first parameters having respective first values established during training of the acoustic model using first training data, the method comprising coupling the transformation component to a portion of the acoustic model, the transformation component comprising second parameters, and training the transformation component by determining, for the second parameters, respective second values using second training data input to the transformation component and processed by the acoustic model, wherein the acoustic model retains the first parameters having the respective first values throughout training of the transformation component.

Some embodiments include a system configured to train a transformation component using a trained acoustic model comprising first parameters having respective first values established during training of the acoustic model using first training data, the system comprising at least one hardware processor configured to couple the transformation component to a portion of the acoustic model, the transformation component comprising second parameters, and train the transformation component by determining, for the second parameters, respective second values using second training data input to the transformation component and processed by the acoustic model, wherein the acoustic model retains the first parameters having the respective first values throughout training of the transformation component.

BRIEF DESCRIPTION OF DRAWINGS

The accompanying drawings are not intended to be drawn to scale. In the drawings, for purposes of clarity, not every component may be labeled in every drawing. In the drawings.

DETAILED DESCRIPTION

Figure 1:
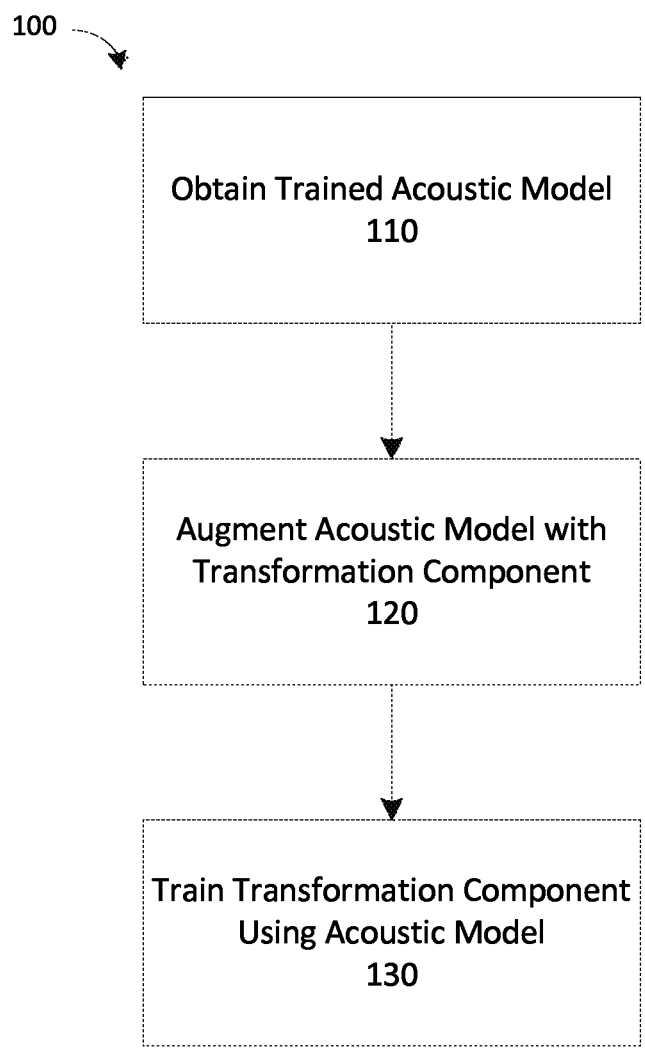
FIG. 1 is a flow chart illustrating a method of training a transformation component, in accordance with some embodiments.

As discussed above, an acoustic model used by an ASR system may be trained using training data that captures the acoustic characteristics of one or more acoustic environments. It is generally desirable to train an acoustic model using training data that captures a wide variety of acoustic characteristics to expand the acoustic domain for which the acoustic model has undergone at least some level of training (i.e., to expand the acoustic domain that the acoustic model has been exposed to and has learned something about). As discussed above, an ASR system is likely to perform well when recognizing speech data having acoustic characteristics that correspond well with the acoustic characteristics of the training data (i.e., the ASR system is likely to perform well when the acoustic characteristics of received speech data is well represented in the training data).

However, when there is a mismatch between the acoustic characteristics of the speech data received during deployment of the ASR system and the acoustic characteristics captured by the training data, speech recognition accuracy is likely to degrade. As discussed above, to train an acoustic model to perform satisfactorily in a given acoustic environment, a large amount of training data typically must be available so that the acoustic model can adequately "learn" the acoustic characteristics of the acoustic environment. It is frequently the case that insufficient or no training data is available for a particular acoustic environment of interest for which training is desired. It is also generally the case that obtaining such training data is cost and/or time prohibitive, if feasible at all.

As an example, large quantities of training data (e.g., hundreds or thousands of hours of speech data) derived from speech obtained from a wide variety of speakers may be available to adequately train an acoustic model for use in a satisfactory general purpose, speaker independent ASR system. However, the training data may have been, for example, obtained primarily or exclusively using headsets or via other "near-field" (also referred to as "close-talk") channels such that the training data incorporates corresponding "near-field" acoustic characteristics.

As a result, while the ASR system may perform well for a wide variety of speakers using headsets or other "near-field" or "close-talk" channels, the ASR system's performance may meaningfully degrade for speech data received from users using "far field" or "far talk" channels, such as a speaker phone, an external microphone attached to a computer or other at-a-distance microphones (e.g., as is often the circumstance when users speak to their smart phones or other personal communication devices). That is, because the acoustic model learned acoustic characteristics of speech obtained in a near-field environment, differences in the acoustic characteristics of speech received in a far-field environment may cause performance degradation.

Conventional techniques that have endeavored to learn a mapping between two acoustic environments have relied upon stereo training data for the respective acoustic environment. Stereo training data refers generally to training data that is substantially the same in content but for the differences in the two acoustic environments for which a mapping is desired. For example, stereo data for two different channel types (e.g., "near-field" and "far-field") would generally include training data having the same speech content obtained over the two different channel types. The mapping between the two different channel types can then be quite easily found because the differences in the acoustic features of the stereo training data obtained via the two different channels can be attributed to the differences between the channels, since the training data is otherwise substantially the same and the correspondence between the stereo training data known. However, stereo training data for two acoustic environments of interest is rarely available.

The inventors have developed techniques for training a transformation component that can subsequently be used to improve the performance of an acoustic model in an acoustic environment different than the acoustic environment represented by training data on which the acoustic model was trained using relatively small amounts of training data representative of the different acoustic environment. Additionally, the techniques developed by the inventors do not rely on stereo training data and can be performed whether stereo training data is available or not.

According to some embodiments, after a transformation component has been trained for a particular acoustic environment (e.g., by learning the feature mapping between two acoustic environments), it can be used effectively to improve the performance of any number of acoustic models on speech data obtained in the particular environment, including those in other languages, for example. As such, the transformation component may be applied as a generic "front-end" to any suitable acoustic model for which performance enhancement in the particular acoustic environment is desired.

The term "acoustic environment" refers generally to any one or combination of factors that influence the acoustic characteristics of speech data. For example, an acoustic environment may be characterized by the channel or channels over which speech data is obtained (e.g., devices and/or transmission medium over which speech data is obtained), the language of speakers producing speech data, dialect of speakers producing speech data, etc. An acoustic environment may also relate to any factor or factors that cause speech data having identical content (e.g., speech data containing the same words in the same order) to have differing acoustic characteristics.

According to some embodiments, training a transformation component includes coupling the transformation component to an acoustic model trained using first training data corresponding to a first acoustic environment, and inputting second training data corresponding to a second acoustic environment to be processed by the acoustic model augmented by the transformation component. During training using the second training data, the transformation component learns a transformation that transforms acoustic features from the second acoustic environment to the first acoustic environment, thereby improving the performance of the acoustic model (and any other acoustic model to which the trained transformation component is coupled) on speech data obtained via the second acoustic environment. Aspects of the transformation component developed by the inventors allows the transformation component to be trained using relatively small amounts of training data corresponding to the second acoustic environment, as discussed in further detail below.

According to some embodiments, the acoustic model comprises a multi-layer neural network (e.g., a deep neural network (DNN)), and the transformation component comprises a linear input network (LIN) layer coupled to provide input to one of the layers of the multi-layer neural network (e.g., the lowest layer of a DNN). The transformation component (e.g., the LIN layer) may then be trained using the second training data in conjunction with the acoustic model (e.g., the multi-layer neural network) without modification to the acoustic model. The transformation component, once trained using the second training data, may provide a linear transformation of acoustic input and provide the transformed acoustic input to the acoustic model to determine the sequence of speech units contained therein, as discussed in further detail below. It should be appreciated that the transformation component may include multiple layers capable of achieving non-linear transformations, however, increasing the complexity of the transformation component generally increases the amount of training data needed to train the transformation component, as also discussed in further detail below.

The inventors have appreciated that since the transformation component may be trained to provide a transformation of acoustic input without affecting the underlying acoustic model, the transformation component, once trained, may be coupled to other acoustic models to improve the performance of such acoustic models in the corresponding acoustic environment without further training of the transformation component and without otherwise modifying the acoustic models. As such, a transformation component may be trained once and subsequently utilized as a "front-end" to improve the performance of any number of suitable acoustic models.

Following below are more detailed descriptions of various concepts related to, and embodiments of, methods and apparatus for training a transformation component to improve performance of one or more acoustic models on speech data obtained via an acoustic environment different from which the one or more acoustic models were trained. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein FIG. 1 is a flow chart illustrating a method of training a transformation component, in accordance with some embodiments. Method 100 may be performed, for example, to train a transformation component that can be used to improve the performance of an acoustic model in an acoustic environment different from which the acoustic model was trained. Stated differently, method 100 may be used to train a transformation component that can be used to improve the accuracy of an acoustic model in processing speech data having acoustic characteristics absent, poorly or under-represented in training data used to train the acoustic model.

In act 110, an acoustic model that has been trained using first training data is obtained. For example, the acoustic model may have been trained using a relatively large corpus of training data. The acoustic model obtained may be implemented using any suitable technique, for example, as a multi-layer neural network, a hidden Markov model (HMMs), a Gaussian mixture model (GMMs), etc. Any acoustic model having a plurality of configurable parameters for which respective values are established during training may be suitable for method 100 described herein.

Figure 2A:
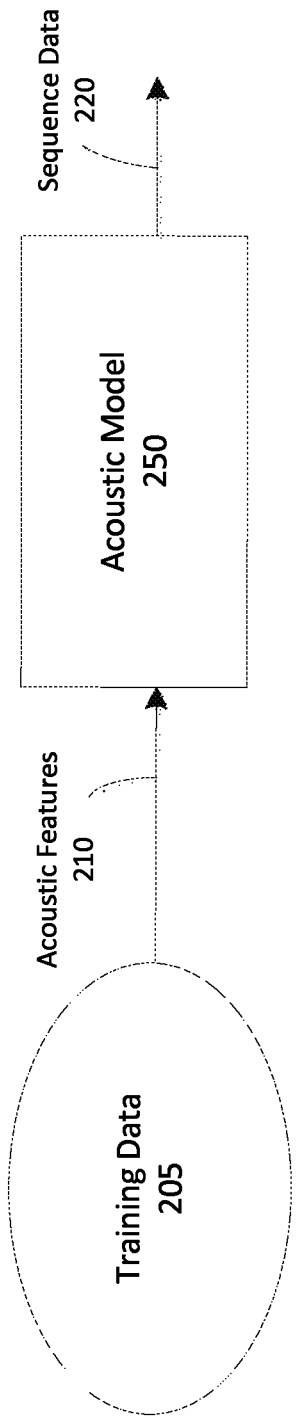
FIG. 2A is a block diagram illustrating an example of training an acoustic model.

For example, referring to FIG. 2A, a suitable acoustic model is illustrated in accordance with some embodiments. Acoustic model 250 is configured to receive, as an input, acoustic features 210 extracted from speech data (e.g., Mel-frequency cepstral coefficients (MFCCs) extracted from a desired number of adjacent and/or overlapping frames of input speech data). During training, acoustic features 210 correspond to acoustic features extracted from training data 205 (e.g., a large corpus of training data) and, during deployment subsequent to training, features 210 correspond to acoustic features extracted from speech data to be recognized. Acoustic model 250 includes a plurality of configurable parameters whose values may be iteratively adjusted during training. The nature of the plurality of parameters will depend on the type of acoustic model being used (e.g., neural network, HMM, GMM, etc.), as discussed in further detail below.

Acoustic model 250 outputs sequence data 220 in response to received acoustic features 210 in a manner governed by a current set of values assigned to the respective plurality of configurable parameters. Sequence data 220 generally comprises a hypothesis for the sequence of speech units (e.g., phonemes, diphones, triphones or any other suitable sub-word speech unit) believed to correspond to the received acoustic features 210. During training, the outputted sequence data 220 may be compared to expected sequence data (also referred to herein as "ground truth") and, based on the comparison, the current set of values (or a portion of the current set of values) of the plurality of parameters are adjusted accordingly.

The expected sequence data may be obtained in a number of ways, for example, by using an existing trained acoustic model known to give results of sufficient accuracy/quality and applying the training data to the existing trained acoustic model, using stored sequence data previously obtained for the training data, expert generated sequence data (if feasible), or some combination thereof. The process of producing sequence data, comparing the sequence data to expected sequence data and updating values of the parameters of the acoustic model is repeated using the available training data. After completion of training, the trained acoustic model has a set of values established for the plurality of parameters that produces sequence data in accordance with what the acoustic model "learned" from processing the training data.

Figure 2B:
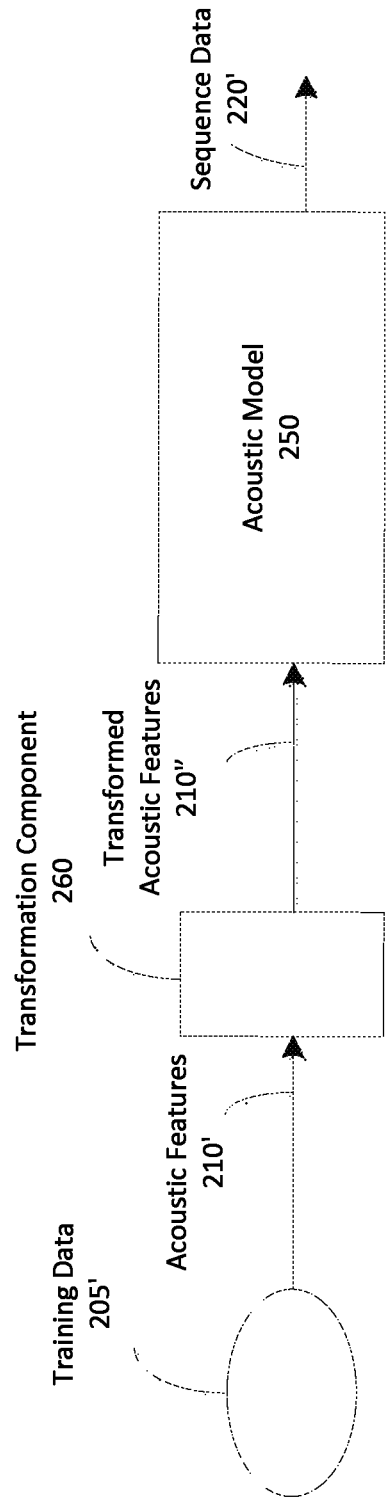
FIG. 2B is a block diagram illustrating adapting the acoustic model trained as illustrated in FIG. 2A using a transformation component, in accordance with some embodiments.

In act 120, the acoustic model is augmented by coupling a transformation component to the acoustic model. The transformation component may be any construct having one or more configurable parameters for which respective values may be established during training. FIG. 2B illustrates an example of a transformation component 260 in accordance with some embodiments. In the exemplary transformation component 260 illustrated in FIG. 2B, the transformation component is configured to receive acoustic features 210' extracted from training data 205' and output transformed acoustic features 210". It should be appreciated that transformation component 260 may be configured to receive input in a form similar to or the same as acoustic model 250, however, this is not a limitation on the techniques described herein, but may facilitate a simpler approach to training a transformation component in conjunction with a given acoustic model.

In general, the transformation component outputs transformed acoustic features 210" in a form expected by or otherwise conforming to the acoustic model so that it is not necessary to modify the acoustic model during training of the transformation component or when subsequently using the trained transformation component to improve the performance of the acoustic model. However, this also is not a limitation of a transformation component as, according to some embodiments, a transformation component may provide information to the acoustic model in a different form or format.

In act 130, the transformation component is trained using training data having acoustic characteristics different from training data used to train the acoustic model. That is, the training data used to train the transformation component may be representative of a different acoustic environment than that represented by the training data used to train the acoustic model. According to some embodiments, the transformation component is trained using the acoustic model, but without further training and/or otherwise modifying the acoustic model itself (e.g., training the transformation component adjusts the values for the parameters of the transformation component without changing the established values for the plurality of parameters of the acoustic model.) For example, with reference to FIG. 2B, transformation component 260 may be trained by inputting to the transformation component acoustic features 210' extracted from training data 205' associated with the acoustic environment to which the acoustic model is being adapted.

As discussed above, training data 205' may require only a relatively small amount of training data to accomplish satisfactory training of transformation component 260, reasons for which are described in further detail below. Additionally, training data 205' is not required to have any stereo training data with respect to training data 205. That is, training data '205 and training data 205 need not have any stereo portion and, as such, training data 205' may be completely independent of training data 205 (e.g., the speakers and speech content of training data '205 may be different than that of training data 205 and there need not be any known correspondence between the two sets of training data). However, training data 205' may include stereo data, as the techniques described herein are not limited for use to any particular type of training data having any particular content.

The transformation component operates on acoustic features 210' extracted from training data 205' according to current values set for the configurable parameters of the transformation component and outputs transformed acoustic features 210" to acoustic model 250. Acoustic model 250, in turn, operates on transformed acoustic features 210" according to the values of the plurality of parameters established during training of acoustic model 250, thereby producing sequence data 220'. Sequence data 220' may then be compared to expected sequence data obtained in any of the ways described above in connection with training the acoustic model, and the values of the parameters of the transformation component adjusted based on the comparison. This process may be repeated iteratively using the available training data 205' and/or until the values of the parameters of the transformation component have satisfactorily converged, or some other criteria indicating that the transformation component has been suitably trained is met.

In circumstances where acoustic model 250 was trained using expected sequence data generated by an existing and typically well-trained acoustic model, there may be benefits to using the same existing trained acoustic model to generate expected sequence data for training data 205', as discussed in further detail below. However, doing so may not be feasible, for example, when the transformation component is not trained generally contemporaneously with the acoustic model, the transformation component is being trained by a different party and/or the trained acoustic model utilized in training acoustic model 250 is otherwise unavailable.

According to some embodiments, the transformation component performs a linear transformation of the acoustic features extracted from the training data. Accordingly, training of such a transformation component effectively results in, by virtue of iteratively adjusting values of the parameters of the transformation component (e.g., values of a multi-dimensional transformation matrix), locating a transformation that transforms acoustic features from the training data in a manner that produces the best results from the acoustic model. That is, the acoustic model, augmented by the established values of the configurable parameters of the trained transformation component captures acoustic characteristics of the corresponding acoustic environment. Having learned a transformation corresponding to the acoustic characteristics of a particular acoustic environment, a trained transformation component may thereafter be used with other suitable acoustic models that the transformation component was not trained in conjunction with to improve the performance of such acoustic models on speech data obtained via the particular acoustic environment.

It should be appreciated that, in some embodiments, the acoustic model is not modified (e.g., acoustic model 250 remains the same throughout training of the transformation component), or modified in ways that do not change the underlying configuration of the acoustic model. That is, as in the example described above, the values of the parameters established during training of the acoustic model that govern the performance of the acoustic model are not modified during training of the transformation component. In this respect, the acoustic model may be "adapted" to the different acoustic environment without modifying the acoustic model itself. The corresponding adapted acoustic model then comprises the plurality of parameters of the acoustic model having respective values established during training of the acoustic model combined with the plurality of parameters of the transformation component having respective values established during training of the transformation component (e.g., the values defining the learned transformation). For example, referring to FIGS. 2A and 2B, the parameters of acoustic model 250 having values established using training data 205 and the parameters of transformation component 260 having values established using training data 205' together form, and characterize the performance of, the adapted acoustic model.

Figure 3:
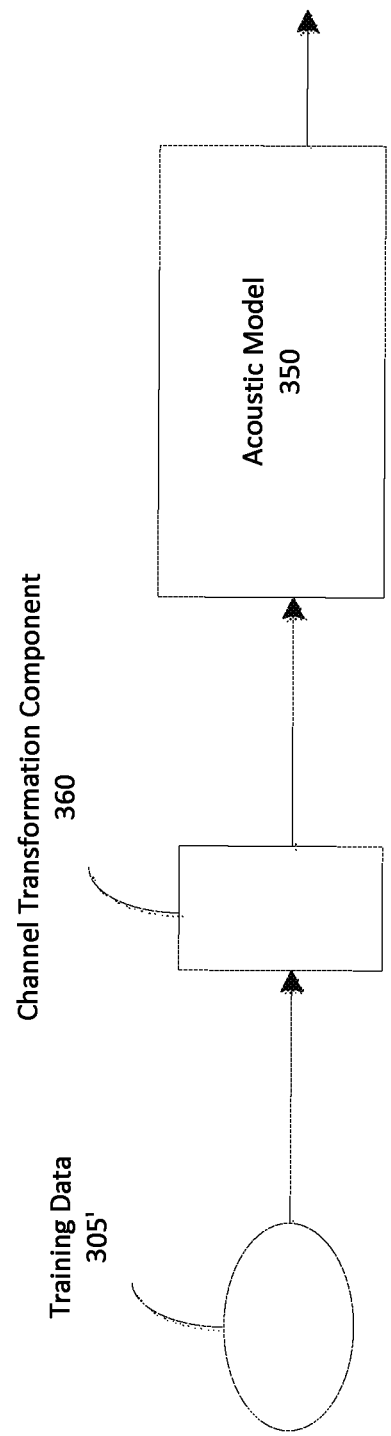
FIG. 3 illustrates a transformation component learning a transformation corresponding to a particular channel type.

As discussed above, one example application of a transformation component is in connection with learning a transformation corresponding to acoustic features of a particular channel type. For example, as illustrated in FIG. 3, the transformation component may be a channel transformation component 360 due to the fact that training data 305' includes training data obtained via a particular channel type, and as a result incorporates acoustic features characteristic of the acoustic environment corresponding to this channel type. Training data 305' may include training data obtained via any type of channel for which it is desired to learn a transformation. That is, the channel type may correspond to particular device types (e.g., mobile devices such as smart phones), microphone types (directional, omnidirectional, arrayed, etc.), transmission medium types (e.g., analog telephone networks, cellular networks, VOIP, packetized digital networks, etc.), or any other factor or factors of a channel for which some amount of training data has been obtained.

According to some embodiments, training data 305' may correspond to speech data obtained via "far-field" channels such as via any device utilized to capture far-field speech (e.g., a device capturing speech using "speaker" functionality that allows speech to be captured at-a-distance and/or without speaking directly into the microphone). As such, channel transformation component, once trained, learns a transformation corresponding to acoustic features characteristic of such "far-field" speech. As one example, acoustic model 350 may have been trained with near-field training data such as speech obtained using near-field or close-talk devices (e.g., headsets or the like), or primarily via such devices. Training data 305', obtained via far-field channels in this example, may be used to train transformation component 360 in conjunction with acoustic model 350 to learn a far-field to near-field transformation.

It is frequently the case that relatively large amounts of training data obtained via near-field channels is available, typically in large enough quantities to adequately train an acoustic model. However, training data obtained via far-field channels may be relatively scarce and generally does not have the robustness of close-talk training data with respect to other acoustic characteristics such as variety of speakers and variety of speech content. Moreover, to the extent that far-field training data is available, it is unlikely to include stereo training data corresponding to the near-field corpus.

Accordingly, the amount of available training data obtained via far-talk channels may be insufficient to satisfactorily train an acoustic model. However, using techniques described herein (e.g., by performing method 100), an acoustic model trained using a relatively large amount of training data obtained predominantly or entirely via near-field channels may be utilized to train a transformation component to learn a transformation corresponding to the acoustic features of speech data obtained via far-field channels using a relatively small amount of corresponding training data (i.e., training data obtained via far-field channels).

Because the techniques developed by the inventors do not require the training data used for training a transformation component to have the same speech content or otherwise correspond to the content of the training data used to train the acoustic model (e.g., stereo close-talk/far-talk training data is not needed), the training data used to train the transformation component may be obtained independently of the training data used to train the acoustic model and generally may be obtained in any manner. This, in combination with the relatively small amounts of training data needed to train the transformation component, makes obtaining training data for a particular acoustic environment significantly less time and cost intensive when such training data is not available, or needs to be supplemented.

It should be appreciated that techniques described herein may be applied to learn a transformation corresponding to any acoustic environment for which training data is available or that can be obtained or generated, and doing so for different channel types is merely one example among many. Indeed, the techniques described herein may be performed using any training data of interest that includes acoustic characteristics for which adaptation may be desired (e.g., language, dialect, accent, speaker, specific background noise conditions such as in a vehicle, etc.), and training a transformation component in this respect is not limited to any particular acoustic environment, type of acoustic environment and/or set of acoustic characteristics.

As discussed above, an acoustic model may be implemented using any suitable technique, including multi-layer neural networks (e.g., a DNN), HMMs, GMMs, etc. According to some embodiments, an acoustic model is implemented as a multi-layer neural network, as schematically shown by multi-layer neural network 450 illustrated in FIG. 4. For example, a feed-forward multi-layer perceptron (MLP), which includes a plurality of layers of nodes forming a configurable directed graph may be used. The most basic MLP includes an input layer and an output layer. MLPs with three or more layers are also commonly referred to as deep neural networks (DNNs), and typically include one or more "hidden" layers arranged between the input and output layers. Each layer in the MLP may include a plurality of processing elements called nodes, which are connected to other nodes in adjacent layers of the network by directed edges. The connections between nodes are associated with weights that can be viewed as defining the strength of association between the nodes. Each node may be associated with an activation function which defines the output of the respective node given one or more inputs. The above described multi-layer neural network (and the exemplary schematic illustration in FIG. 4) is merely an example of a suitable construct for implementing an acoustic model and any other variation on this construct may be suitable as well.

Any one or more of the node connections, edge weights, activation functions (or parameters thereof), etc., may be configurable to allow the neural network to be trained. The values assigned to this set of configurable parameters govern how the neural network processes input and produces an output. As such, by iteratively adjusting the values of the configurable parameters to improve the output (e.g., via comparing output produced by the neural network processing training data with expected output), the neural network can be effectively trained. Modifying the values of the configurable parameters may be performed in any suitable way, for example, using error back-propagation and/or any other known optimization technique(s).

It should be appreciated that acoustic models implemented using different techniques (e.g., HMMs, GMMs, etc.) will have their own respective set of configurable parameters that allow the models to be trained. As such, the number and type of configurable parameters will depend not only on what parameters a designer would like to make configurable (and which to constrain) for a given model, but also on the type of model being used to implement an acoustic model.

Figure 4:
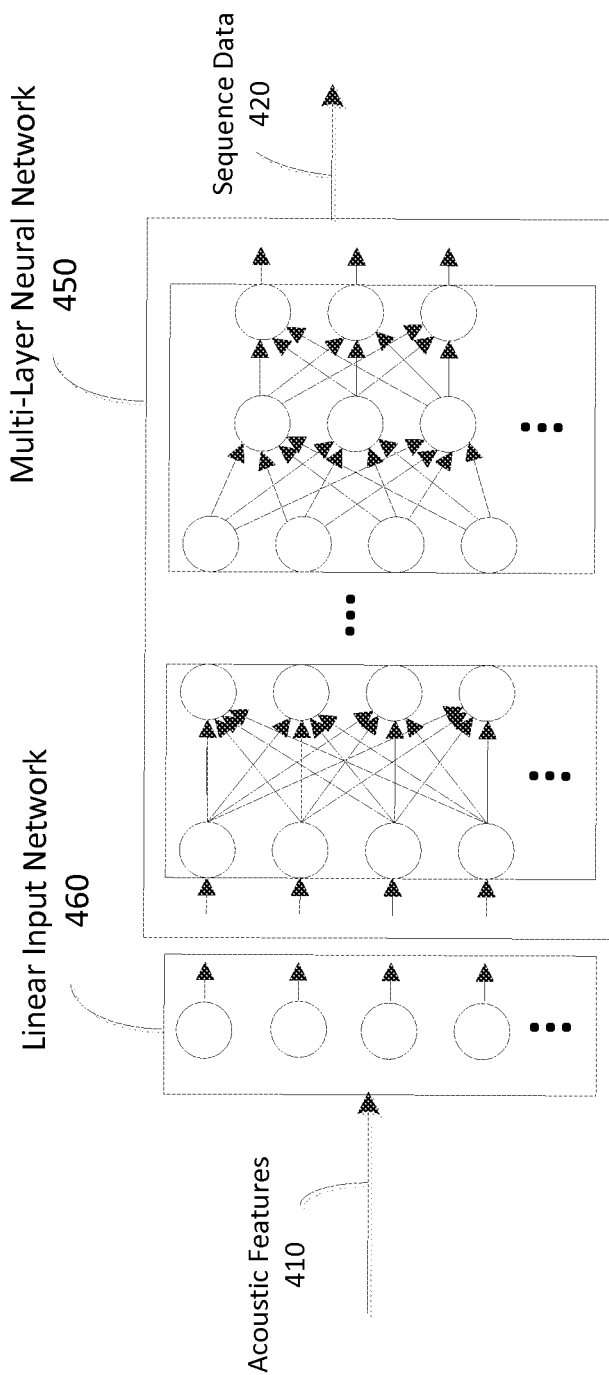
FIG. 4 illustrates schematic examples of a transformation component implemented as a linear input network and an acoustic model implemented as a multi-layer neural network, in accordance with some embodiments.

As discussed above, the input to such a neural network implemented acoustic model is typically a desired number of acoustic features extracted from the training data (e.g., acoustic features 410 illustrated in FIG. 4). For example, the training data may comprise a corpus of speech data and the acoustic features may correspond to acoustic features extracted from "frames" of the speech data (e.g., by sliding a window of desired length temporally along the speech data and extracting desired features from the speech data within the window to form a feature vector for the corresponding portion of the speech data.). Any desired acoustic feature may be extracted including a desired number of Mel-frequency cepstral coefficients (MFCCs) and/or any other acoustic features of interest.

As also discussed above, the output of such a neural network acoustic model may include sequence data identifying the specific sequence of speech units believed to correspond to the associated acoustic feature input (e.g., sequence data 420 illustrated in FIG. 4). For example, the neural network may output a hypothesis regarding the particular sequence of phonemes believed to correspond to the associated acoustic features extracted from a given portion of the speech data. During recognition, this sequence data is used to identify the words associated with the corresponding sequence of speech units. The above described input and output example is provided merely to illustrate the general context of the input and output of an acoustic model (or portion of an acoustic model), as there are many variations on this general scheme (e.g., in some implementations, deciphering the word(s) corresponding to a particular sequence of speech units is at least partially implemented by the acoustic model and may form at least portions of the sequence data).

As discussed above, a transformation component may be any construct having a set of configurable parameters that facilitates training of the transformation component. According to some embodiments, the transformation component comprises a linear input network (LIN) configured to augment a corresponding acoustic model. For example, in the context of the multi-layer neural network described above, the transformation component may be implemented as a LIN layer coupled to the lowest layer of nodes in the neural network (e.g., the layer that receives the acoustic feature input), as schematically shown, without limitation, by linear input network layer 460 coupled to the first layer of nodes in multi-layer neural network 450 in FIG. 4.

For example, the LIN layer may be configured as a single or multiple layers of a neural network having, at its input, nodes corresponding in number to the acoustic feature input. Nodes in the LIN layer may be connected to nodes in a corresponding layer (e.g., the input layer) in the acoustic model via edges (either statically or configurably) and assigned edge weights (which may be initialized to any desired value) whose values may be adjusted during training. The activation function of the nodes of the LIN layer may be linear to provide a linear transformation between the input and output of the LIN layer. One or more parameters of the activation functions may also be made configurable, though this is in no manner a requirement.

During training, the set of configurable parameters of the LIN layer may be adjusted based on a comparison of the sequence data produced by the augmented acoustic model (i.e., the trained acoustic model having a transformation component coupled to a portion of the acoustic model) in response to acoustic features of the training data being provided as input to the LIN layer, transformed by the LIN layer, and provided as input to the acoustic model. Upon completion of training, the LIN layer has established values for the set of configurable parameters that transforms the acoustic features such that the acoustic model, operating on the transformed acoustic features, produces sequence data that accurately reflects the content of the corresponding training data (e.g., LIN layer 460 learns a transformation that maps acoustic features from the acoustic environment on which it was trained to the acoustic environment in which acoustic model 450 was trained).

It should be appreciated that the described LIN layer (and the schematic illustration of LIN layer 460 in FIG. 4) is merely one example of a transformation component that may be used to implement techniques described herein, and other constructs for learning a transformation and/or capturing acoustic characteristics may be used. Furthermore, it should be appreciated that the type of transformation component used may depend on the type of acoustic model being adapted. However, any type of transformation component that can be suitably coupled with a corresponding acoustic model may be used. Generally speaking, a transformation component may be any construct having a set of configurable parameters that may be modified during training that operate to transform acoustic feature input in accordance with acoustic properties of the training data.

It should be appreciated that a transformation component may involve any level of complexity desired and may perform non-linear transformations as well as linear transformations. However, relatively simple transformation components such as the LIN layer described above may be beneficial in that it typically takes less training data to train the transformation component (e.g., the LIN layer described above tends to converge relatively quickly with relatively small amounts of training data). While more sophisticated approaches (e.g., transformation components that perform non-linear transformations) may result in improvement of the learned transformation, they typically require meaningfully more training data to do so. Accordingly, design of a given transformation component may take into consideration the amount of training data available.

As discussed above, in accordance with some embodiments, while training of the transformation component utilizes a given acoustic model to establish values for the configurable parameters, once trained, the transformation component does not rely on the acoustic model to perform the transformation learned during training. As a result, a trained transformation component can be used in connection with other acoustic models to transform acoustic features to improve the performance of such acoustic models in an acoustic environment for which the transformation component learned a corresponding feature transformation or feature mapping. As a result, the trained transformation component may be utilized as a generic front-end that can be coupled to any suitable acoustic model to provide the learned transformation corresponding to the acoustic environment characterized by the training data used to train the transformation component, as illustrated in FIG. 5.

Figure 5:
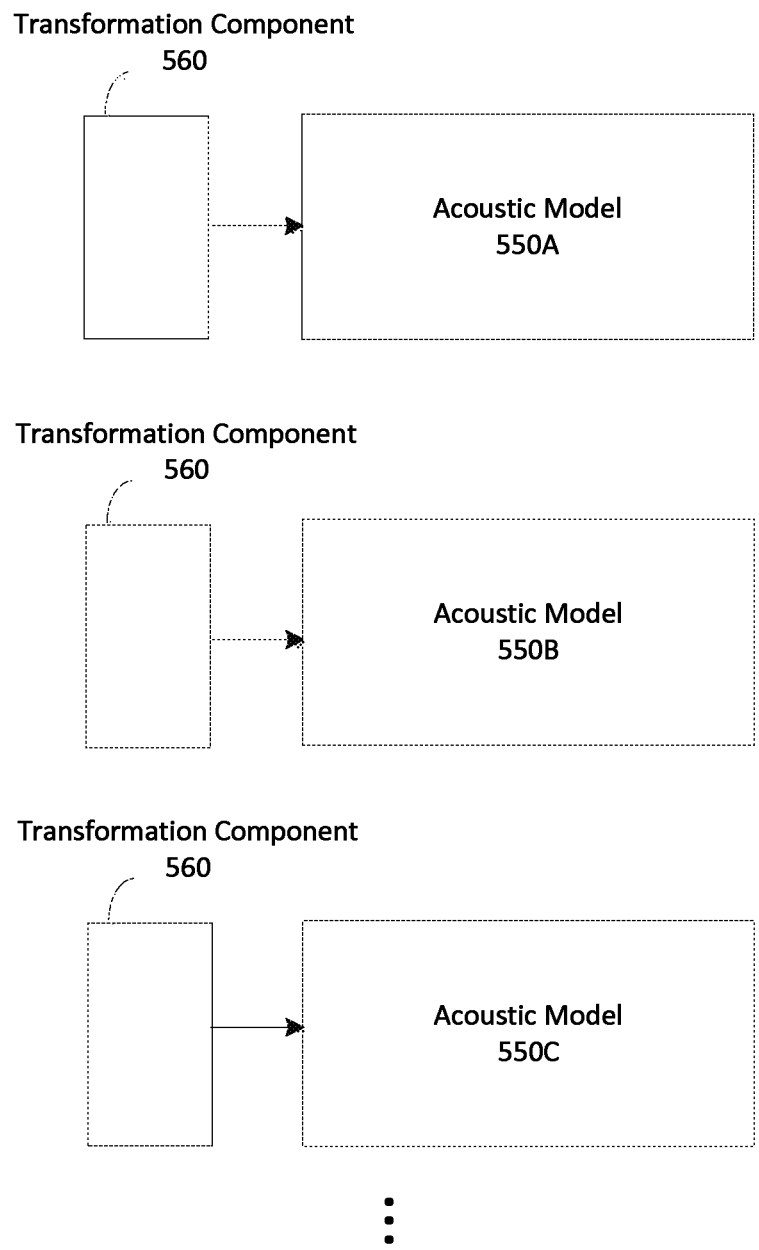
FIG. 5 illustrates the ability of a trained transformation component to be utilized with multiple different acoustic models.

FIG. 5 illustrates a trained transformation component 560 being utilized to improve the performance of multiple acoustic models 550A, 550B, 550C, etc., in the acoustic environment corresponding to the transformation learned by transformation component 560 during training. For example, transformation component 560 may have been trained to learn a transformation corresponding to a particular acoustic environment for which training data was available using any suitable acoustic model (e.g., as described in connection with FIGS. 1, 2A and 2B). Once trained, transformation component 560 can be utilized independent of the acoustic model used in training transformation component 560 to improve the performance of other suitable acoustic models. For example, transformation component 560 may be coupled to the input of example acoustic models 550A, 550B and/or 550C to adapt the performance of the acoustic models to the acoustic environment for which the transformation component was trained.

In some circumstances, the transformation learned by transformation component 560 may be generally language independent. For example, when transformation component 560 has learned a transformation corresponding to a particular channel type, the transformation may be language independent, and transformation component 560 may be suitably utilized with acoustic models trained for different languages. As an example, transformation component 560 may have been trained using an acoustic model trained for the English language using English language training data characteristic of a particular channel type. Using the techniques described herein, the trained transformation component 560 will learn a transformation corresponding to the channel type and therefore can be used in connection with acoustic models in other languages (e.g., acoustic model 550A, 550B and 550C may each correspond to acoustic models trained for different languages). Other acoustic environments, such as particular noise environments, may similarly be language independent such that a transformation component trained to learn a transformation corresponding to such an environment may also be suitable for use with acoustic models in other languages.

It should be appreciated that transformation component 560 is capable of learning transformations that may not be language independent and use with acoustic models in other languages may not be suitable or may be less effective in such instances. It should be further appreciated that the different acoustic models illustrated in FIG. 5 may correspond to acoustic models that differ in any way and are depicted to illustrate generally that transformation component 560 can be utilized with any suitable acoustic model. For example, acoustic models 550A, 550B and 550C may be similar acoustic models utilized in different product lines or acoustic models that were trained using different training data corpuses, as utilizing a trained transformation component with different acoustic models is not limited to any particular difference or set of differences between the acoustic models, nor do the separate acoustic models need not differ at all.

As discussed above, the acoustic model and/or transformation component are trained by comparing the output (e.g., sequence data) produced by the acoustic model with expected output (e.g., expected sequence data). The expected sequence data may be obtained from a number of sources, but is typically obtained using the acoustic model of a generally well-trained ASR system. In particular, an existing trained acoustic model may be used to operate on desired training data (either training data for training the acoustic model or training data for training the transformation component) to produce sequence data (or other output) corresponding to the training data, which can be used as the expected sequence data (or expected output) to train the corresponding system (i.e., either the acoustic model or the transformation component).

It may be beneficial to use the same existing trained acoustic model to generate expected sequence data to train both the acoustic model and the transformation component. In particular, a given trained acoustic model may be used to generate sequence data for the relatively large corpus of training data being used to train an acoustic model, and the acoustic model may be trained therefrom. The same acoustic model may be used to generate sequence data for the training data on which the transformation component is to be trained. By using the same existing trained acoustic model to produce both sets of expected sequence data, differences in sequence data produced by the augmented acoustic model (i.e., the acoustic model having the transformation component coupled thereto) when operating on training data associated with the acoustic environment for which the transformation component is being trained and expected sequence data from the existing trained acoustic model operating on that training data may be more readily attributable to the acoustic characteristics of the training data.

Figure 6:
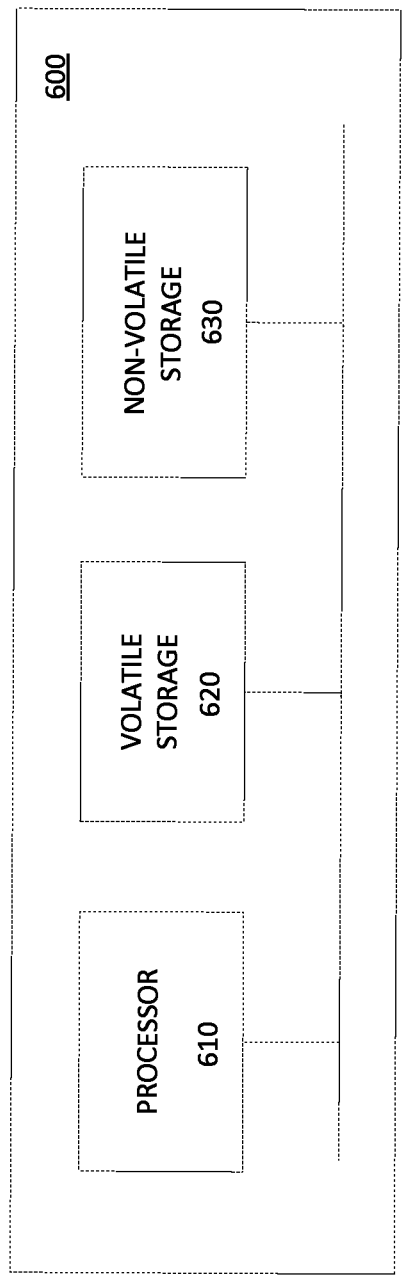
FIG. 6 illustrates a schematic of a computer system on which techniques described herein may be implemented, according to some embodiments.

While a system for training a transformation component in accordance with the techniques described herein may take any suitable form or configuration, an illustrative implementation of a computer system 600 that may be used to implement one or more techniques described herein is shown in FIG. 6. The computer system 600 may include one or more processors 610 and one or more computer-readable storage media (i.e., tangible, non-transitory, computer-readable media). The computer-readable storage media may include, for example, volatile memory 620 and/or one or more non-volatile storage media 630. The processor 610 may control writing data to and reading data from the memory 620 and the non-volatile storage 630 in any suitable manner, as aspects of the techniques described herein are not limited in this respect. To perform functionality and/or techniques described herein, the processor 610 may execute one or more instructions stored in one or more computer-readable storage media (e.g., volatile storage 620, non-volatile storage 630, and/or any other suitable computer-readable storage medium), which may serve as tangible, non-transitory computer-readable storage media storing instructions for execution by the processor 610.

In some embodiments, one or more processors 610 may include one or more processing circuits, including, but not limited to, a central processing unit (CPU), a graphics processing unit (GPU), a field-programmable gate array (FPGA), an accelerator, and/or any other suitable device (e.g., circuit) configured to process data. One or more processors 610 may include any suitable processor (e.g., processing circuit) or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) programmed using microcode or software to perform the functions recited above.

In connection with techniques for training a transformation component described herein, code used to, for example, perform speech recognition using a trained speech recognition system may be stored on one or more computer-readable storage media of computer system 600. Processor 610 may execute any such code to provide any techniques for speech recognition described herein. Any other software, programs or instructions described herein may also be stored and executed by computer system 600. It will be appreciated that computer code may be applied to any aspects of methods and techniques described herein.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, DVDs, optical discs, magnetic tapes, flash memories, circuit configurations in Field Programmable Gate Arrays or other semiconductor devices, etc.) encoded with one or more programs that, when executed on one or more processors, implement the various embodiments of the above-described techniques. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform the techniques described herein need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more methods, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of adapting a trained acoustic model, which was trained using first training data including speech data obtained over a near-field channel type, to process speech data obtained over a far-field channel type, the trained acoustic model comprising first parameters having respective first values established during training of the trained acoustic model using the first training data, wherein the trained acoustic model comprises a multi-layer neural network, the method comprising:

using at least one computer processor to perform:
  obtaining second training data comprising speech data obtained over the far-field channel type without obtaining corresponding stereo data over the near-field channel type; and
  adapting the trained acoustic model to process speech data obtained over the far-field channel type by:
    augmenting the trained acoustic model with a transformation component configured to receive input derived from speech data obtained over the far-field channel type, apply a transformation to the input to obtain transformed input, and provide the transformed input as input to the trained acoustic model, the transformation component comprising second parameters and at least one network layer, wherein the transformation component is configured to linearly transform the input to obtain the transformed input, wherein the augmenting comprises coupling outputs of the at least one network layer of the transformation component to inputs of a first layer of the multi-layer neural network; and
    training the transformation component by using only the second training data to determine respective second values for the second parameters, wherein training the transformation component by using only the second training data to determine the respective second values for the second parameters comprises:
      comparing sequence data output by the trained acoustic model in response to the transformed input with an expected sequence data output; and
      adjusting the second values for the second parameters based on the comparison of the sequence data output and the expected sequence data output.

2. The method of claim 1, wherein the trained acoustic model comprises a deep neural network and the at least one network layer of the transformation component comprises a linear input network, and wherein the augmenting comprises coupling outputs of the linear input network to inputs of an input layer of the deep neural network.

3. The method of claim 1, wherein the second training data is obtained independently of the first training data.

4. At least one non-transitory computer readable storage medium storing instructions that, when executed by at least one hardware processor, perform a method of adapting a trained acoustic model, which was trained using first training data including speech data obtained over a near-field channel type, to process speech data obtained over a far-field channel type, the trained acoustic model comprising first parameters having respective first values established during training of the trained acoustic model using the first training data, wherein the trained acoustic model comprises a multi-layer neural network, the method comprising:
    obtaining second training data comprising speech data obtained over the far-field channel type without obtaining corresponding stereo data over the near-field channel type; and
    adapting the trained acoustic model to process speech data obtained over the far-field channel type by:
        augmenting the trained acoustic model with a transformation component configured to receive input derived from speech data obtained over the far-field channel type, apply a transformation to the input to obtain transformed input, and provide the transformed input as input to the trained acoustic model, the transformation component comprising second parameters and at least one network layer, wherein the transformation component is configured to linearly transform the input to obtain the transformed input, wherein the augmenting comprises coupling outputs of the at least one network layer of the transformation component to inputs of a first layer of the multi-layer neural network; and
        training the transformation component by using only the second training data to
            determine respective second values for the second parameters, wherein training the transformation component by using only the second training data to determine the respective second values for the second parameters comprises:
                comparing sequence data output by the trained acoustic model in response to the transformed input with an expected sequence data output; and
                adjusting the second values for the second parameters based on the comparison of the sequence data output and the expected sequence data output.

5. The at least one non-transitory computer readable medium of claim 4, wherein the trained acoustic model comprises a deep neural network and the at least one network layer of the transformation component comprises a linear input network, and wherein the augmenting comprises coupling outputs of the linear input network to inputs of an input layer of the deep neural network.

6. The at least one non-transitory computer readable medium of claim 4, wherein the second training data is obtained independently of the first training data.

7. A system configured adapt a trained acoustic model, which was trained using first training data including speech data obtained over a near-field channel type, to process speech data obtained over a far-field channel type, the trained acoustic model comprising first parameters having respective first values established during training of the trained acoustic model using the first training data, wherein the trained acoustic model comprises a multi-layer neural network, the system comprising:
    at least one hardware processor configured to:
        obtaining second training data comprising speech data obtained over the far-field channel type without obtaining corresponding stereo data over the near-field channel type; and
        adapting the trained acoustic model to process speech data obtained over the far-field channel type by:
            augmenting the trained acoustic model with a transformation component configured to receive input derived from speech data obtained over the far-field channel type, apply a transformation to the input to obtain transformed input, and provide the transformed input as input to the trained acoustic model, the transformation component comprising second parameters and at least one network layer, wherein the transformation component is configured to linearly transform the input to obtain the transformed input, wherein the augmenting comprises coupling outputs of the at least one network layer of the transformation component to inputs of a first layer of the multi-layer neural network; and
            training the transformation component by using only the second training data to determine respective second values for the second parameters, wherein training the transformation component by using only the second training data to determine the respective second values for the second parameters comprises:
                comparing sequence data output by the trained acoustic model in response to the transformed input with an expected sequence data output; and
                adjusting the second values for the second parameters based on the comparison of the sequence data output and the expected sequence data output.

8. The system of claim 7, wherein the second training data is obtained independently of the first training data.

9. The method of claim 1, wherein the trained acoustic model retains the first parameters having the respective first values throughout training of the transformation component.

10. The at least one non-transitory computer-readable storage medium of claim 4, wherein the trained acoustic model retains the first parameters having the respective first values throughout training of the transformation component.

11. The system of claim 7, wherein the trained acoustic model retains the first parameters having the respective first values throughout training of the transformation component.

12. The method of claim 1,
    wherein the second training data further comprises expected sequence data corresponding to the speech data obtained over the far-field channel type, the expected sequence data comprising sub-word speech units corresponding to the acoustic speech data in the second training data, and
    wherein training the transformation component comprises determining the respective second values for the second parameters at least in part by:
        transforming at least some of the speech data obtained over the far-field channel type to obtain transformed speech data;
        providing the transformed speech data as input to the trained acoustic model to obtain output sequence data; and comparing output sequence data to the expected sequence data.

13. The at least one non-transitory computer readable storage medium of claim 4,
wherein the second training data further comprises expected sequence data corresponding to the speech data obtained over the far-field channel type, the expected sequence data comprising sub-word speech units corresponding to the acoustic speech data in the second training data, and
wherein training the transformation component comprises determining the respective second values for the second parameters at least in part by:
transforming at least some of the speech data obtained over the far-field channel type to obtain transformed speech data;
providing the transformed speech data as input to the trained acoustic model to obtain output sequence data; and
comparing output sequence data to the expected sequence data.

14. The system of claim 7,
wherein the second training data further comprises expected sequence data corresponding to the speech data obtained over the far-field channel type, the expected sequence data comprising sub-word speech units corresponding to the acoustic speech data in the second training data, and
wherein training the transformation component comprises determining the respective second values for the second parameters at least in part by:
transforming at least some of the speech data obtained over the far-field channel type to obtain transformed speech data;
providing the transformed speech data as input to the trained acoustic model to obtain output sequence data; and
comparing output sequence data to the expected sequence data.

* * * * *